United States Patent [19]

Climenhage et al.

[11] 4,337,188
[45] Jun. 29, 1982

[54] POLYOLEFIN COMPOSITION FOR MANUFACTURE OF FILM HAVING CLING PROPERTIES

[75] Inventors: David C. Climenhage, Kingston; Walter R. Eadie, North Bay, both of Canada

[73] Assignee: Du Pont Canada Inc., Mississauga, Canada

[21] Appl. No.: 200,198

[22] Filed: Oct. 24, 1980

Related U.S. Application Data

[63] Continuation of Ser. No. 104,117, Dec. 17, 1979, abandoned.

[51] Int. Cl.$^3$ .............................................. C08K 5/49
[52] U.S. Cl. .......................... 524/140; 260/DIG. 16; 260/DIG. 17; 260/DIG. 19; 524/245; 524/249; 524/317; 524/377; 524/525; 524/528; 524/476
[58] Field of Search ............ 260/28.5 A, 28.5 B, 260/30.6 R, 32.6 A, 33.2 R, 33.6 PQ, 33.6 AQ, 33.6 UA, DIG. 16, DIG. 17, DIG. 19

[56] References Cited

U.S. PATENT DOCUMENTS

| | | |
|---|---|---|
| 3,631,132 | 12/1971 | McGaugh et al. ................ 260/94.9 |
| 4,022,729 | 5/1977 | Prickril ............................ 260/28.5 B |
| 4,066,811 | 1/1978 | Naito et al. ........................... 428/220 |
| 4,144,214 | 3/1979 | Corbacella ....................... 260/23 H |
| 4,169,820 | 10/1979 | Bock et al. ....................... 260/23.5 A |

FOREIGN PATENT DOCUMENTS

| | | |
|---|---|---|
| 740371 | 8/1966 | Canada . |
| 790657 | 7/1968 | Canada . |
| 798416 | 11/1968 | Canada . |
| 913265 | 10/1972 | Canada . |
| 1487051 | 1/1976 | United Kingdom . |
| 2010862 | 7/1979 | United Kingdom . |

Primary Examiner—Melvyn I. Marquis

[57] ABSTRACT

A composition capable of being used for the manufacture of polyolefin film having so-called "cling" properties is disclosed. The composition consists essentially of
(a) an intimate mixture of 75–98 weight percent of a first component and 2–25 weight percent of a second component, and
(b) at least 200 ppm, based on the weight of (a), of an agent selected from the class consisting of
(i) an organic compound having at least one polar group and at least one group selected from the class consisting of alkylene and alkylene interrupted by oxygen, said alkylene having at least eight carbon atoms and said compound being a liquid or a waxy solid;
(ii) mineral oil;
(iii) a liquid polyolefin; and
(iv) an organic phosphate ester that is a liquid or waxy solid; and mixtures of such agents.

A preferred agent is N,N-bis(2-hydroxyethyl) alkylamine where the alkyl group is $C_{12}$–$C_{18}$ alkyl group. The first component is a blend of 10–100 percent of at least one homopolymer of ethylene having a density of 0.915–0.930 g/cm$^3$ and a melt index of 0.2–10 with 0–90 percent of at least one ethylene/α-olefin copolymer having a density of 0.915–0.930 g/cm$^3$ and a melt index of 0.2–5.0. The second component is an elastomer having a Mooney viscosity in the range 15–70. Film manufactured from the composition is useful in the wrapping of articles or the sprial wrapping of loaded pallets.

9 Claims, No Drawings

POLYOLEFIN COMPOSITION FOR MANUFACTURE OF FILM HAVING CLING PROPERTIES

This is a continuation of application Ser. No. 104,117, filed Dec. 17, 1979 now abandoned.

BACKGROUND OF THE INVENTION

1. Field of the Invention

The present invention relates to polyolefin compositions, and more particularly to compositions capable of being used for the manufacture of polyolefin film having so-called "cling" properties, "cling" being the term used to describe the ability of a film to stick or cling to itself without the use of an adhesive, heat treatment or the like.

2. Description of the Prior Art

Plastic films exhibiting cling properties are well known in the packaging trade. Such films are used in supermarkets, especially in North America, for the packaging of fresh meat. For instance selections of fresh meat, for example, beef or pork chops, ground or minced meat, poultry and the like, may be placed on a tray, for example a foamed polystyrene tray, and wrapped with a plastic film that has the ability to cling to itself. Cling film is also sold in roll form for use in households.

Plastic film has recently been used in the stretch wrapping of loaded pallets in which the pallets are spirally wrapped, on a rotating turntable, with film maintained under tension. The properties of the film must be such that the load on the pallet is protected and held in place during shipment. The use of a film with cling properties could permit automatic wrapping of loaded pallets without any need for the use of an adhesive.

Cling film used in supermarkets is usually a polyvinyl chloride film while that used in households may be polyvinyl chloride or polyvinylidene chloride film, the latter being used primarily because of its barrier properties. Polyolefin films, especially polyethylene films, have generally not been used in packaging applications requiring film with cling properties because they tend to lack adequate cling characteristics.

It is known to incorporate additives into polyethylene to provide the polyethylene with antistatic properties. Examples of such additives are N,N-bis(2-hydroxyethyl) alkylamine where the alkyl group is a $C_{12}$–$C_{18}$ alkyl group and N-(3-dodecyloxy-2-hydroxypropyl) ethanolamine.

SUMMARY OF THE INVENTION

Accordingly the present invention provides a polyolefin composition capable of being used for the manufacture of film having cling properties, said composition consisting essentially of:

(a) an intimate mixture of 75–98 weight percent of a first component and 2–25 weight percent of a second component, and (b) at least 200 parts per million, based on the weight (a), of an agent selected from the class consisting of (i) an organic compound having at least one polar group and at least one group selected from the class consisting of alkylene and alkylene interrupted by oxygen, said alkylene having at least eight carbon atoms and said compound being a liquid or a waxy solid;

(ii) mineral oil;

(iii) a liquid polyolefin; and (iv) an organic phosphate ester that is a liquid or waxy solid; and mixtures of such agents wherein the first component is a polyethylene blend comprising 5–100 weight percent of at least one homopolymer of ethylene having a density in the range 0.915 to 0.930 g/cm$^3$ and melt index in the range 0.2 to 10 with 0–95 weight percent of at least one copolymer of ethylene and a $C_4$–$C_8$ α-olefin having a density in the range 0.915 to 0.930 g/cm$^3$ and melt index in the range 0.2 to 5.0, and wherein the second component is an elastomer selected from the group consisting of a copolymer of ethylene and propylene having a Mooney viscosity in the range 15 to 70 and a copolymer comprised of ethylene, propylene and a non-conjugated diene having a Mooney viscosity in the range 15 to 70.

DETAILED DESCRIPTION OF THE INVENTION

A composition for the manufacture of polyolefin film having cling properties and capable of being used in packaging applications has now been found.

In a preferred embodiment of the composition of the present invention, the polyethylene blend comprises 10–20 weight percent of the homopolymer of ethylene and 80–90 weight percent of the copolymer of ethylene and the α-olefin.

In another embodiment, the agent is N,N-bis(2-hydroxyethyl) alkylamine, where the alkyl group is a $C_{12}$–$C_{18}$ alkyl group.

In a further embodiment, the intimate mixture is a mixture of 85–95 weight percent of the polyethylene blend and 5–15 weight percent of the elastomer.

The composition of the present invention consists essentially of (a) an intimate mixture of 75–98 weight percent of a polyethylene blend and 2–25 weight percent of an elastomer and (b) at least 200 parts per million, based on the weight of (a), of an agent as defined hereinabove.

The polyethylene blend comprises 5–100, preferably 10–100, weight percent of at least one homopolymer of ethylene and 0–95, preferably 0–90, weight percent of at least one copolymer of ethylene and butene-1. The homopolymer(s) of ethylene are homopolymers having a density in the range 0.915 to 0.930, preferably 0.918 to 0.922, g/cm$^3$ and a melt index in the range 0.2 to 10, preferably 0.5 to 10, dg/min, melt index being measured by the procedure of ASTM D-1238 (condition E). Such polymers are known in the art and may be obtained, for instance, by the polymerization of ethylene in the presence of a free radical catalyst.

The copolymer(s) of ethylene and $C_4$–$C_8$ α-olefin are copolymers having a density in the range 0.915 to 0.930, preferably 0.918 to 0.930, g/cm$^3$ and a melt index in the range 0.2 to 5.0, preferably 0.5 to 1.0, dg/min. Such copolymers are known in the art and may be obtained, for instance, by the polymerization of ethylene and α-olefin in the presence of a coordination catalyst system. The preferred α-olefins are butene-1, hexene-1, and octene-1.

In a preferred embodiment of the present invention the polyethylene is a blend of 5–20 weight percent of homopolymer of ethylene and 80–95 weight percent of copolymer of ethylene and α-olefin, especially butene-1.

The elastomer may be a copolymer of ethylene and propylene. Alternatively the elastomer may be a copolymer comprised of ethylene, propylene and a non-conjugated diene, examples of which are available under the trade mark NORDEL. In an embodiment the diene may be 1,5-hexadiene. The Mooney viscosity of the elastomer should be in the range 15 to 70, especially in the range 25 to 60. Mooney viscosity is determined according to the procedure of ASTM D-927-49T.

The composition of the present invention also contains at least 200 ppm, based on the weight of the intimate mixture of the polyethylene blend and elastomer, of an agent. The agent may be (i) an organic compound having at least one polar group and at least one group selected from the class consisting of alkylene and alkylene interrupted by oxygen, said alkylene having at least eight carbon atoms and said compound being a liquid or a waxy solid;

(ii) mineral oil;

(iii) a normally liquid polyolefin; and (iv) an organic phosphate ester that is a liquid or waxy solid; and mixtures of such agents.

In a preferred embodiment the organic compounds are characterized by a polar group at or near at least one end of the molecule. Moreover the alkylene group may be attached to hydrogen and thereby form an end of the molecule.

Examples of the organic compound of the agent are N,N-bis(2-hydroxyethyl) alkylamine or N-(3-alkoxy-2-hydroxypropyl) ethanolamine, where the alkyl group is a $C_{10}$–$C_{18}$ alkyl group, and polyethylene glycol.

A preferred agent is N,N-bis(2-hydroxyethyl) alkyl amine, where the alkyl group is a $C_{12}$–$C_{18}$ alkyl group, which is available under the trade mark ARMOSTAT A10. N,N-bis(2-hydroxyethyl) alkylamine is also available with the alkyl group being, for example, substantially $C_{16}$ or $C_{18}$. A preferred N-(3-alkoxy-2-hydroxypropyl) ethanolamine is N-(3-dodecyloxy-2-2-hydroxypropyl) ethanolamine. Examples of polyethylene glycols are the glycols available from Union Carbide under the trade mark CARBOWAX, especially CARBOWAX 600.

An example of a normally liquid polyolefin is that polyolefin, believed to be a polybutene having an $M_n = 650$ and a density of 0.874, available from Petrofina Canada under the trade mark PETROFIN 30.

Examples of the liquid or waxy solid organic phosphate esters are the complex organic phosphate ester of the ethylene oxide adduct type that is available from GAF Corporation under the trade mark GA-FAC GB-510 and the free acid of a complex organic phosphate ester available from GAF Corporation under the trade mark GAF-STAT AS-710.

The compositions of the present invention may contain mixtures of the agents defined above, especially such mixtures in which one of the agents is N,N-bis(2-hydroxyethyl) alkylamine, where the alkyl group is a $C_{12}$–$C_{18}$ alkyl group.

The composition may also contain an antioxidant suitable for use with polyolefins.

The amount of agent used may depend on the particular agent used. Although in general 500–1500 ppm of agent may be preferred, for some agents it may be preferred to use higher amounts of agent e.g. 20,000 ppm or more. Use of high amounts of agent is in general not preferred, especially on economic considerations.

Film may be manufactured from compositions of the present invention by extruding the composition through an annular die in a film extrusion process. One such film extrusion process is the so-called "conventional" process, an embodiment of which is described by E. D. Fuller in Canadian Pat. No. 460,963 which issued on Nov. 8, 1949. In a conventional process molten polyolefin polymer is extruded through an annular die and the tubular molten polyolefin film formed is continuously withdrawn from the die, cooled, flattened and wound up on a roll. The molten polyolefin is cooled, usually by means of an air ring, soon after the polyolefin is extruded through the die. The tubular film may be expanded to the desired extent prior to the cooling of the polyolefin or, in particular, after cooling but prior to the flattening of the tubular film. Expansion of the tube is usually accomplished by means of a controlled pressure of gas inside the tubular film.

A frost line occurs during the cooling of the molten polymer. As the polymer cools the temperature of the polymer falls below the melting point of the polymer and the polymer solidifies. This solidification of the polymer causes a change in the optical properties of the polymer. The change in optical properties of the polymer may be observed in the film and the position at which it occurs is known as the frost line.

In a blown film process of the type described above, the blow-up ratio is the ratio of the diameter of the expanded polyolefin film to the diameter of the annular die.

Cling film may be manufactured from the compositions of the invention using film extrusion conditions known in the art, especially under those conditions known as a low frost line/low blow-up ratio blown film process. The extrusion conditions may, however, have an effect on the properties of the film obtained, as is illustrated hereinafter. In particular for some compositions it may be preferable to control the film extrusion process so that the frost line is at a distance of less than 40 cm, especially less than 25 cm, from the annular die. In addition the film may preferably be manufactured at a blow-up ratio in the range 1.2–2.5:1 and especially in the range 1.2–2.0:1.

Cling film manufactured from compositions of the invention may be used in the wrapping of articles, especially in the wrapping of fresh meat on trays for sale in supermarkets or in the spiral wrapping of loaded pallets.

As may be noted from the examples hereinafter, the cling of the film may increase with time after manufacture of the film, especially in the first 1–2 weeks after such manufacture.

The manufacture of cling film is illustrated by the following examples. All parts and percentages are by weight unless otherwise specified.

EXAMPLE I

A number of compositions were extruded, at a melt temperature of 220°–240° C., through an annular die of a blown film process. The annular die had a diameter of 10.2 cm and the die gap of the die was approximately 1.02 mm. The tubular molten film formed was withdrawn continuously from the annular die through an air ring, the outlet of which was approximately 2.5 cm from the die. The tubular film formed was flattened and wound up. All film was a thickness of 25 um.

Additional experimental details and the results obtained are given in TABLE I.

The cling was measured by the following procedure:

An adhesive tape, preferably a tape of the type known as a reinforcing tape, measuring 2.54 cm and at least 12.70 cm in length was applied to a roll of the film to be tested; the tape was applied to the roll of film, rather than to a sample of film, to reduce wrinkling of the film to be tested. The film was then cut along both sides of the tape, thereby forming a tape/film strip 2.54 cm in width. The strip was cut in half laterally and then placed in film/film contact so that the area of contact was 6.45 sq. cm. The sample was pressed together under a pressure of 6.3 kg/cm$^2$ for 3 seconds, for example in an INSTRON* tester, and then pulled apart longitudinally at 1.27 cm/minute. The results i.e. the force required to pull the strips apart, are reported hereinafter in kilograms. The cling was measured within 1–3 days of the manufacture of the film.

*denotes trade mark.

It can be seen that it is possible to produce film from compositions of the invention which has a cling value (measured as above) of over 3.5 kg.

The measurement of the stress exponent of polymers is described in Canadian Pat. Nos. 664,699 of C. E. Ashby, S. F. Foster and E. T. Pieski, which issued June 11, 1963, and 771,260 of D. J. Ryan and B. J. Starkey, which issued Nov. 7, 1967.

EXAMPLE II

The procedure of Example I was repeated under different process conditions, details of which are given in TABLE II. The composition used in all runs of TABLE II contained 10% by weight of VISTALON* 702 ethylene-propylene elastomer, 90% by weight of a 90:10 of ALATHON* 1550 polyethylene and the copolymer of ethylene and butene-1 of Example I, and 1000 ppm of N,N-bis(2-hydroxyethyl) alkylamine where the alkyl group is $C_{12}$–$C_{18}$.

*denotes trade mark.

Details of the results obtained are given in TABLE II.

EXAMPLE III

The procedure of Example I was repeated under different process conditions, details of which are given in TABLE III. The annular die on the extruder had a diameter of 2.5 cm.

In the measurement of cling the sample was pressed together under a pressure of 4.2 kg/cm$^2$ for 3 seconds in an INSTRON tester prior to being pulled apart longitudinally at 1.27 cm/minute. In addition the cling was not measured until at least one day after manufacture of the film.

Additional experimental details and the results obtained are given in TABLE III. The polyethylene homo- and copolymers and the elastomer used were those of Example I.

It can be seen that it is possible to produce film from compositions of the invention which has a cling value (measured as above) of over 6 kg when measured after 10 days from manufacture of the film.

EXAMPLE IV

The procedure of Example III was repeated except that the cling was measured on samples that had been pressed together under a pressure of 2.1 kg/cm$^2$ and 0.7 kg/cm$^2$.

Additional experimental details and the results obtained are given in Table IV.

TABLE I

| Run No.* | 1 | 2 | 3 | 4 | 5 | 6 | 7 |
|---|---|---|---|---|---|---|---|
| Polyethylene** Homopolymer (%) | 10 | 10 | 0 | 10 | 10 | 10 | 10 |
| Copolymer (%) | 90 | 90 | 100 | 90 | 90 | 90 | 90 |
| Mixture Polyethylene (%) | 90 | 90 | 90 | 90 | 90 | 90 | 90 |
| Elastomer*** (%) | 10 | 10 | 10 | 10 | 10 | 10 | 10 |
| Alkyl amine**** (ppm) | 1500 | 1500 | 1500 | 1500 | 1500 | 1000 | 500 |
| Frost Line Height (cm) | 18 | 18 | 18 | 18 | 18 | 18 | 18 |
| Blow-up ratio | 2:1 | 2:1 | 2:1 | 2:1 | 2:1 | 2:1 | 2:1 |
| Melt Temperature (°C.) | 230 | 240 | 230 | 238 | 238 | 230 | 238 |
| Cling (kg) | 4.4 | 4.4 | 0 | 3.9 | 3.8 | 3.7 | 4.4 |

| Run No.* | 8 | 9 | 10 | 11 | 12 | 13 | 14 | 15 |
|---|---|---|---|---|---|---|---|---|
| Polyethylene** Homopolymer (%) | 10 | 10 | 10 | 10 | 10 | 100 | 10 | 10 |
| Copolymer (%) | 90 | 90 | 90 | 90 | 90 | 0 | 90 | 90 |
| Mixture Polyethylene (%) | 93 | 95 | 100 | 90 | 90 | 90 | 100 | 90 |
| Elastomer (%) | 7 | 5 | 0 | 10 | 10 | 10 | 0 | 10 |
| Alkyl amine**** (ppm) | 1500 | 1500 | 1500 | 1500 | 1500 | 1500 | 0 | 0 |
| Frost Line Height (cm) | 18 | 18 | 18 | 18 | 18 | 18 | 18 | 18 |
| Blow-up ratio | 2:1 | 2:1 | 2:1 | 2:1 | 2:1 | 2:1 | 2:1 | 2:1 |
| Melt Temperature (°C.) | 238 | 238 | 238 | 238 | 238 | 230 | 238 | 238 |
| Cling (kg) | 4.3 | 3.3 | 3.1 | 3.4 | 3.6 | 4.0 | 0 | 0 |

*Runs 3, 10 and 14–15 are comparison runs.
**The homopolymer was an ethylene homopolymer of a density of 0.916 and a melt index of 8.1 except in Run 13 where it was an ethylene homopolymer of a density of 0.920 and a melt index of 1.9. The copolymer was an ethylene/butene-1 copolymer of a density of 0.919 g/cm$^3$, a melt index of 0.7 g and a stress exponent of 1.37.
***An ethylene/propylene copolymer having a density of 0.87 and a Mooney viscosity of 25, available under the trade mark VISTALON 702, except for Run 12 where the elastomer was an ethylene/propylene/diene copolymer having a Mooney viscosity of 25, available under the trade mark NORDEL 2722, and Run 13 where the elastomer was an ethylene/propylene/diene copolymer having a Mooney viscosity of 60, available under the trade mark NORDEL 1500.
****N,N-bis(2-hydroxyethyl) alkylamine where the alkyl group is $C_{12}$–$C_{18}$.

TABLE II

| Run No.* | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| Frost Line Height (cm) | 15 | 23 | 25 | 28 | 41 | 48 | 56 | 18 | 38 | 56 | 18 | 38 | 58 | 18 | 38 | 58 | 25 |
| Blow-up ratio | 2:1 | 2:1 | 2:1 | 2:1 | 2:1 | 2:1 | 2:1 | 1:1 | 1:1 | 1:1 | 3:1 | 3:1 | 3:1 | 2:1 | 2:1 | 2:1 | 4:1 |
| Melt Temperature (°C.) | 238 | 238 | 238 | 232 | 232 | 227 | 232 | 227 | 227 | 227 | 230 | 230 | 232 | 227 | 227 | 238 | 232 |
| Cling (kg) | 3.8 | 3.8 | 4.1 | 3.9 | 3.5 | 2.4 | 0 | 5.7 | 2.6 | 0 | 2.9 | 2.2 | 0 | 4.9 | 3.0 | 0 | 0 |

*This Table shows how the film extrusion conditions may affect the cling properties of film made from compositions of the invention.

TABLE III

| Run No. | 33 | 34 | 35 | 36 | 36a* |
|---|---|---|---|---|---|
| Polyethylene Homopolymer (%) | 12.5 | 12.5 | 11.8 | 11.8 | |

TABLE III-continued

| | | | | | |
|---|---|---|---|---|---|
| Copolymer (%) Mixture | 87.5 | 87.5 | 88.2 | 88.2 | |
| Polyethylene (%) | 90 | 90 | 90 | 90 | |
| Elastomer (%) | 10 | 10 | 10 | 10 | |
| Additive | | | | | |
| Time | A | A | B | C | |
| Amount (ppm) | 1000 | 1000 | 250 | 250 | |
| Frost Line Height (cm) | 2.5 | 2.5 | 2.5 | 2.5 | |
| Blow-up ratio | 1:1 | 2.1:1 | 1.3:1 | 1.3:1 | |
| Melt Temperature (°C.) | 228 | 230 | 242 | 243 | |
| Cling | | | | | |
| Age of film (days) | 21 | 10 | 1 | .1 | 12 |
| Value (kg) | 6.4 | 6.5 | 4.7 | 4.2 | 8.0 |

| Run No. | 37 | 37a* | 38 | 38a* |
|---|---|---|---|---|
| Polyethylene Homopolymer (%) | 11.8 | | 11.8 | |
| Copolymer (%) Mixture | 88.2 | | 88.2 | |
| Polyethylene (%) | 90 | | 90 | |
| Elastomer (%) | 10 | | 10 | |
| Additive | | | | |
| Type | D | | E | |
| Amount (ppm) | 250 | | 250 | |
| Frost Line Height (cm) | 2.5 | | 2.5 | |
| Blow-up ratio | 1.3:1 | | 1.3:1 | |
| Melt Temperature (°C.) | 242 | | 242 | |
| Cling | | | | |
| Age of film (days) | 1 | 12 | 1 | 12 |
| Value (kg) | 4.4 | 6.0 | 3.3 | 5.9 |

*In run 36a the cling was remeasured on samples of the same film after the indicated time from manufacture.
*In runs 37a and 38a the cling was remeasured on samples of the same film after the indicated time from manufacture.

Details of Additives
A - N,N-bis(2-hydroxyethyl) alkylamine where the alkyl group is $C_{12}-C_{18}$.
B - Carbowax ® 600, a polyethylene glycol, available from Union Carbide Canada Limited of Montreal Quebec, added as a concentrate in SCLAIR ® 2914 polyethylene resin (density 0.960 and melt index 50, obtainable from Du Pont Canada Inc.).
C - Glycerol oleate, available from Emery Industries of Mauldin, S. C. as EMEREST ® 2421
D - GA-FAC ® GB-510, a surfactant believed to be a complex organic phosphate ester of the ethylene oxide adduct type, available from GAF Corporation, New York, N. Y.
E - GAF-STAT ® AS-710, an antistatic agent believed to be the free acid of a complex organic phosphate ester, available from GAF Corporation, New York, N. Y.

TABLE IV

| Run No. | 39 | 40 | 41 | 42 |
|---|---|---|---|---|
| Polyethylene Homopolymer (%) | 12.5 | 14.3 | 16.7 | 11.3 |
| Copolymer (%) Mixture | 87.5 | 85.7 | 83.3 | 88.7 |
| Polyethylene (%) | 90 | 80 | 70 | 90 |
| Elastomer (%) | 10 | 20 | 30 | 10 |
| Additive | | | | |
| Type | A | A | A | F |
| Amount (ppm) | 1000 | 1000 | 1000 | 20 000 |
| Frost Line Height (cm) | 2.5 | 2.5 | 2.5 | 2.5 |
| Blow-up ratio | 1.3:1 | 1.3:1 | 1.3:1 | 1.3:1 |
| Melt Temperature (°C.) | 243 | 243 | 244 | 243 |
| Cling | | | | |
| (a) 2.1 kg/cm² pressure | | | | |
| Age of film (days) | 7 | 7 | 7 | 7 |
| Value (kg) | 7.3 | 6.7 | 4.9 | 8.4 |
| (b) 0.7 kg/cm² pressure | | | | |
| Age of film (days) | 7 | 7 | 7 | 7 |
| Value (kg) | 7.0 | 5.6 | 6.5 | 8.1 |

| Run No. | 43 | 44 | 45 |
|---|---|---|---|
| Polyethylene Homopolymer (%) | 11.3 | 11.3 | 11.3 |
| Copolymer (%) Mixture | 88.7 | 88.7 | 88.7 |
| Polyethylene (%) | 90 | 90 | 90 |
| Elastomer (%) | 10 | 10 | 10 |
| Additive | | | |
| Type | A/F | C/F | G |
| Amount (ppm) | 100/10 000 | 10 000/10 000 | 20 000 |
| Frost Line | 2.5 | 2.5 | 2.5 |
| Blow-up ratio | 1.3:1 | 1.3:1 | 1.3:1 |
| Melt Temperature (°C.) | 243 | 243 | 243 |
| Cling | | | |
| (a) 2.1 kg/cm² pressure | | | |
| Age of film (days) | 7 | 7 | 7 |
| Value (kg) | 6.9 | 4.9 | 8.3 |
| (b) 0.7 kg/cm² pressure | | | |
| Age of film (days) | 7 | 7 | 7 |
| Value (kg) | 6.0 | 3.8 | 7.7 |

Details of Additives
A - N,N-bis(2-hydroxyethyl) alkylamine where the alkyl group is $C_{12}-C_{18}$.
C - Glycerol oleate, available from Emery Industries of Mauldin, S.C. as EMEREST ® 2421.
F - Mineral oil.
G - A hydrogenated polyolefin, believed to be a liquid polybutene having an $M_n$ = 650 and a density of 0.874 available from Petrofina Canada of Montreal, Quebec as Petrofin ® 30.

We claim:

1. A polyolefin composition capable of being used for the manufacture of film having cling properties, said composition consisting essentially of
   (A) an intimate mixture of about 75–98 weight percent of a first component and about 2–25 weight percent of a second component, wherein the first component is a polyethylene blend comprising from about 10 to about 20 weight percent of at least one homopolymer of ethylene having a density in the range of from about 0.915 to about 0.930 g/cm³ and melt index in the range of from about 0.2 to about 10 with from 80 to about 90 weight percent of at least one copolymer of ethylene and a $C_4$–$C_8$ α-olefin having a density in the range of from about 0.915 to about 0.930 g/cm³ and melt index in the range of from 0.2 to about 5.0, and wherein the second component is an elastomer selected from the group consisting of a copolymer of ethylene and propylene having a Mooney viscosity in the range of from about 15 to about 70 and a copolymer comprised of ethylene, propylene and a nonconjugated diene having a Mooney viscosity in the range of from about 15 to about 70, and
   (B) at least about 200 parts per million, based on the weight of (A), of an agent selected from the class consisting of
      (a) N,N-bis(2 hydroxyethyl) alkylamine, where the alkyl group is a $C_{12}$–$C_{18}$ alkyl group;
      (b) one of
         (i) a liquid of waxy solid organic compound selected from the group consisting of N-(3 alkoxy-2 hydroxypropyl) ethanolamine, where the alkyl of the alkoxy group is a $C_{10}$–$C_{18}$ alkyl group, polyethylene glycol and glycerol oleate;
         (ii) mineral oil;
         (iii) a liquid polyolefin;
         (iv) an organic phosphate ester that is a liquid or waxy solid; and
      (c) mixtures of agent (a) with agent (b).

2. The composition of claim 1 in which the agent is N,N-bis(2-hydroxyethyl) alkylamine, where the alkyl group is a $C_{12}$–$C_{18}$ alkyl group.

3. The composition of claim 1 in which the intimate mixture is a mixture of from about 85 to about 95 weight percent of the polyethylene blend and from about 5 to about 15 weight percent of the elastomer.

4. The composition of claim 1 in which the agent is a liquid or waxy solid organic compound selected from the group consisting of N-(3 alkoxy-2 hydroxypropyl)ethanolamine, where the alkyl of the alkoxy group is a $C_{10}$–$C_{18}$ alkyl group, polyethylene glycol and glycerol oleate.

5. The composition of claim 1 in which the agent is mineral oil.

6. The composition of claim 1 in which the agent is a liquid polyolefin.

7. The composition of claim 1 in which the agent is an organic phosphate ester that is a liquid or a waxy solid.

8. The composition of claim 1 in which the agent is a polyethylene glycol.

9. The composition of claim 1 in which the agent is glycerol oleate.

* * * * *